UNITED STATES PATENT OFFICE.

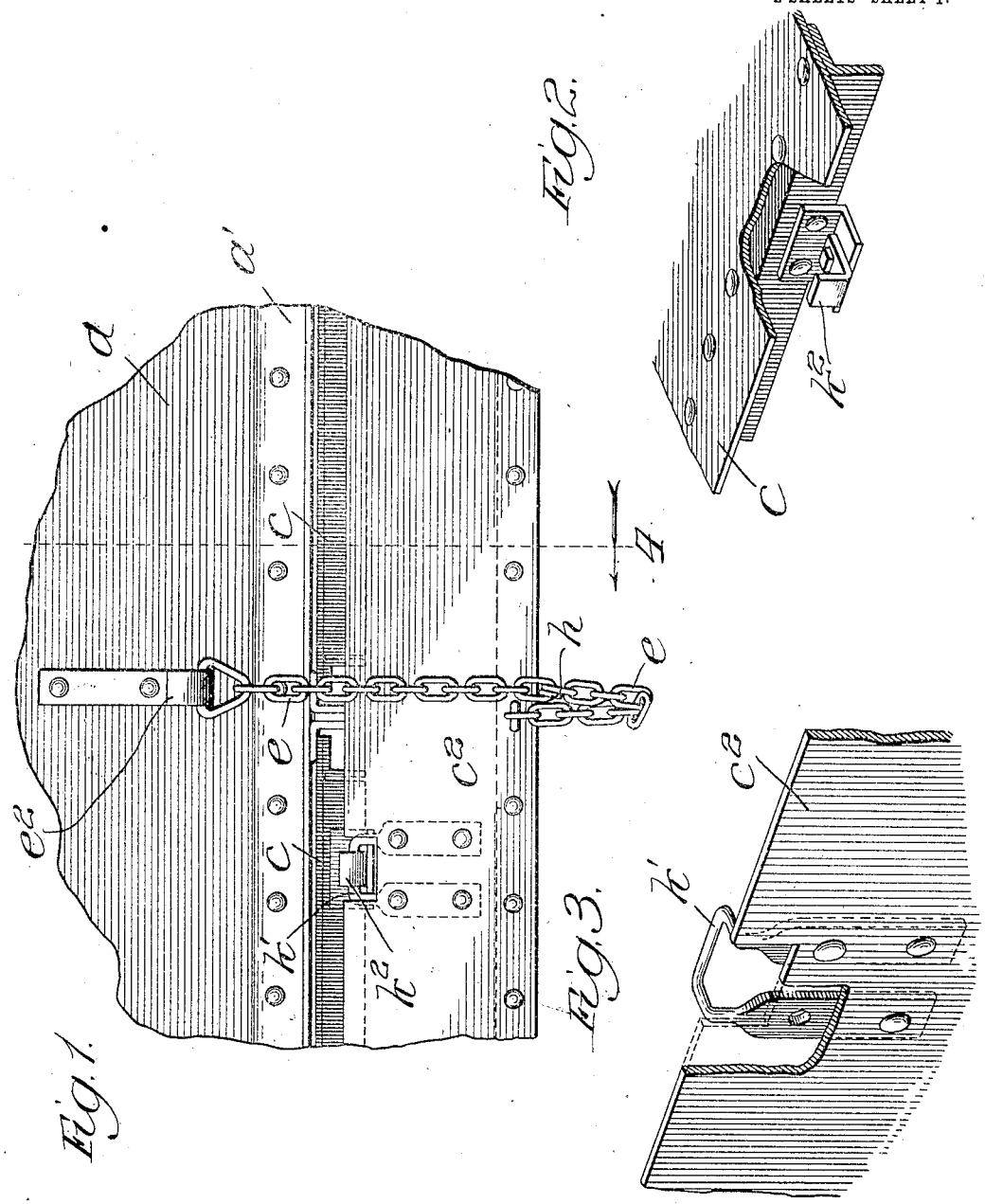

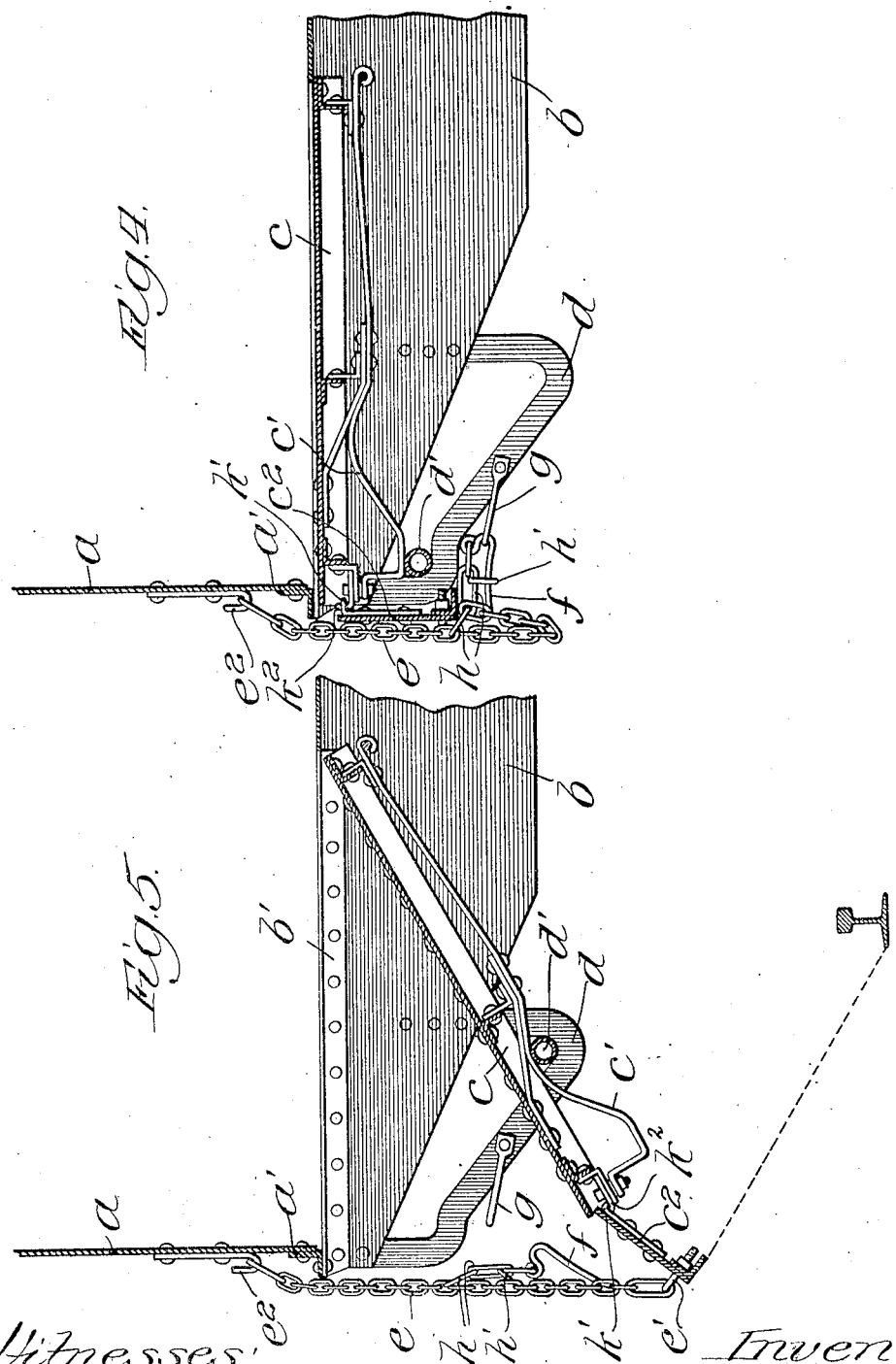

OTTO W. MEISSNER, OF MONTREAL, QUEBEC, CANADA, ASSIGNOR TO NATIONAL DUMP CAR COMPANY, A CORPORATION OF MAINE.

DUMP-CAR.

No. 869,445.    Specification of Letters Patent.    Patented Oct. 29, 1907.

Application filed November 7, 1906. Serial No. 342,377.

*To all whom it may concern:*

Be it known that I, OTTO W. MEISSNER, a citizen of the United States, residing in the city of Montreal, Province of Quebec, Dominion of Canada, have invented certain new and useful Improvements in Dump-Cars, of which the following is a specification.

My invention relates to dump cars, especially to dump cars of the "National" type, comprising a bottom containing dumping doors by means of which the load may be discharged at the sides of the car, and the object of the invention is to provide a simple, efficient and economical means whereby the load may be discharged without interfering with the tracks. To this end my invention consists in the combinations and details hereinafter set forth and claimed.

In the accompanying drawings—Figure 1 is a side elevation of a portion of a dump car having my improvements applied thereto. Figs. 2 and 3 are detail perspective views. Figs. 4 and 5 are end elevations, partly in section, showing the operation of the dumping doors.

In discharging the load at the sides of the car, it is some times desirable to discharge the load at some distance from the track, in order that the material discharged from the car may not fall upon the track and prevent the movement of the car upon the track. In the carrying out of this purpose I provide a car of the "National" type, which, as is well-known to those skilled in this art, comprises a bottom having a series of dumping doors $c$ hinged near the center sill of the car. These dumping doors are operated by means of a reciprocating rod $d'$ traveling upon an inclined track $d$ secured to the frame portion of the car and engaging the track $c'$ upon the door. When closed, the doors, in combination with the floor plates, form a substantially flat bottom car and the doors extend from the center sill to the sides $a$ of the car. In order to provide means for discharging the load from a car of this type at a point remote from the rail, in those cases in which such a discharge is desirable, I provide the doors with extensions $c^2$ hinged along the outer edge of the doors. The form of hinge which I have employed comprises a loop $k'$ attached to the extension and a hook $k^2$ engaged by this loop, said hook being attached to the main portion of the door along the front edge thereof. Connecting the outer edge of the door with the side $a$ of the car is a chain $e$ connected at one end to the side of the car by a hook $e^2$ and at its other end to the extension by an eye-bolt $e'$.

It will be observed that when the dumping doors are closed the extension $c^2$ hangs downward at the outer edge thereof in an inoperative position. The chain $e$ is of such length that when the dumping doors are opened—as shown in Fig. 5—the hinged extensions are raised so as to form practically a continuation of the surface of the dumping doors, thus enabling the material to pass over both the main portion of the dumping doors and the extension thereof and be thrown outwardly at some distance from the track.

In order to hold the extension in its inoperative position when the doors are closed, I provide a chain at an intermediate point with links $h$ having a hook member $f$, which hook member is adapted to engage with the hook $g$ on the track $d$. One of the links $h$ is provided with a sliding loop $h'$ adapted to slide over the free end of the hook $f$ and hold the hook in the position shown in Fig. 4. By this means the chain $e$ is held against the side of the car, preventing the outward movement of the extension $c^2$. It will be observed that owing to the fact that the loops on the extensions engage the open hook $k^2$ while the chain engages the open hook $e^2$, the extensions may readily be detached from the free ends of the door so that when the car is in motion the extensions may be removed therefrom. It is thus possible to send the cars from place to place without the extensions, the extensions being applied to the doors upon arrival at the point of discharge.

The operation of my device will be readily understood without further description.

I claim:

1. A car of the class described having a floor provided with openings, hinged dumping doors completely filling the openings when in closed position, hinged extensions for the doors, said extensions depending from the doors when the doors are closed, and means for bringing the extensions into substantial alinement with the doors when the doors are open.

2. A car of the class described having the usual complete sides, a floor comprising hinged dumping doors whose free edges engage the sides of the cars when the doors are in closed position, and extensions mounted on the free edges of the doors and forming a continuation of the doors when the doors are open.

3. A car of the class described having a floor provided with door openings, hinged dumping doors filling said openings when closed, extension members for said doors, and means for detachably mounting the extension members on the free edges of the doors.

OTTO W. MEISSNER.

Witnesses:
WINFIELD YOST,
ROBERT M. ZIMMERMAN.